United States Patent [19]

Biethan et al.

[11] 3,852,375

[45] Dec. 3, 1974

[54] COATING COMPOSITIONS

[75] Inventors: Uwe Biethan, Marl; Jorg Dorffel, Lippramsdorf; Karl-Heinz Hornung, Marl; Franz Riemhofer, Gossmannshofen, all of Germany

[73] Assignee: Chemische Werke Huls A.G., Marl, Germany

[22] Filed: Apr. 20, 1971

[21] Appl. No.: 135,691

[30] Foreign Application Priority Data

Apr. 22, 1970 Germany.............................. 2019282

[52] U.S. Cl. ........ 260/850, 117/132 B, 117/132 BF, 117/161 K, 117/161 LN, 260/33.4 R, 260/33.4 P, 260/33.6 R, 260/39 R, 260/75 R, 260/75 N, 260/826, 260/834

[51] Int. Cl.......................................... C08g 37/34

[58] Field of Search.......................... 260/850, 75 N

[56] References Cited
UNITED STATES PATENTS

| | | | |
|---|---|---|---|
| 2,901,465 | 8/1959 | Sample | 260/850 |
| 2,915,486 | 12/1959 | Shelley | 260/850 |
| 3,461,186 | 8/1969 | Galiano et al. | 260/850 |
| 3,476,697 | 11/1969 | Clements | 260/850 |
| 3,549,577 | 12/1970 | Stromberg | 260/850 |
| 3,553,284 | 1/1971 | Riemhofer et al. | 260/850 |
| 3,678,128 | 7/1972 | Riemhofer et al. | 260/850 |
| 3,686,360 | 8/1972 | Cunningham | 260/850 |

*Primary Examiner*—John C. Bleutge
*Attorney, Agent, or Firm*—Millen, Raptes & White

[57] ABSTRACT

Aminoplast-ester coating compositions which are substantially solvent-free and which have good resistance to solvents and chemical attack and good adherence to metals and good mechanical properties are produced from an aminoplast-ester mixture wherein the ester has a molecular weight of less than 600 and is the esterification product of one or both of ethylene glycol and 1,2-propanediol and a mixture of phthalic acid and adipic acid or like acids.

13 Claims, No Drawings

COATING COMPOSITIONS

BACKGROUND OF THE INVENTION

This invention relates to novel coating compositions; more particularly, to coating compositions containing as the binder a mixture comprising an aminoplast and a ester.

A number of coating compositions are known which contain as a binder mixtures of aminoplasts and polyesters, i.e., plasticized aminoplast resins. All of these conventional coating compositions contain the binder in a relatively dilute solution, which have a number of known disadvantages, e.g., troublesome odor, fire hazard and health dangers because of organic solvents, high energy requirements, and especially for the evaporation of water in the case of aqueous coating systems.

A number of other coating compositions which are free of a solvent or low in solvent content are also known which, although they avoid the disadvantages caused by solvents, exhibit other properties which are often undesired and disadvantageous. See W. A. Riese, "Loeserfreie Anstrichsysteme", Curt R. Vincentz Publishers, Hannover (1967). Thus, the plastisols, in most cases polyvinyl chloride based, are, for example, not sufficiently resistant to chemical attack and, especially, are not resistant to solvents. Moreover, due to loss of plasticizer, the coatings often become brittle. Even the epoxy systems, which can be employed without a solvent exhibit, despite their very advantageous properties a number of disadvantages. In addition to the health dangers and troublesome odors caused by the curing agents employed, important disadvantages are the short processing times of finished coating mixtures produced from them, which cause difficulties in processing and necessitate the use of two-component spray guns. The processing time of epoxy resin systems, which is short to begin with, is still further reduced when these systems are employed without a solvent.

Similar disadvantages are exhibited by unsaturated polyester resins, e.g., the brief processing times of finished mixtures and the air sensitivity of the curing reaction, which can be overcome only by the addition of wax or by the use of very specific resins. The polyurethane systems have as draw-backs short processing times, the danger to one's health due to their isocyanate content and the high water sensitivity of the cross-linking reaction, which results, in case water is not carefully excluded, in the formation of faults and bubbles in the coating.

Therefore, attempts have been made early to develop aminoplast-based solvent-free coating compositions.

Thus, in German Published Application No. 1,101,667, aminoplast-based solvent-free enamels are described which are obtained by mixing aminoplast solutions with conventional plasticizers and then distilling off the solvent. Especially suitable plasticizers set forth in this connection are plasticizers containing hydroxyl groups, e.g., castor oil. However, plasticizers without hydroxyl groups, such as petroleum distillates or customary phthalate plasticizers are likewise employed. The coatings produced from such coating compositions by baking have only minor resistance to solvents, a low resistance to chemical attack, poor adherence to metals, and unsatisfactory mechanical properties (see Comparative Experiment).

Furthermore, it is known from German Pat. No. 1,231,833 that it is possible, by the addition of curing [hardening] agents, also to produce cold-curing coating compositions from the above-described coating compositions of DAS No. 1,101,667. No improvement in the coating properties is obtained thereby.

German Published Application No. 1,595,857 discloses specific aminoplasts which can also be employed in a solvent-free form. The coatings produced therefrom, although hard, are brittle and inelastic. Also, combinations of these special aminoplast resins with conventional varnish resins are said to be processable without a solvent. However, such mixtures have a very high viscosity and thus can be applied only in a complicated fashion. Moreover, coatings therefrom are not superior to coatings from conventional raw materials.

The article in "Farbe und Lack" [Paint and Varnish] 75, 639 (1969) discloses nothing above and beyond the above-described state of the art and is a survey of the above-referred-to publications and clearly points to the fact that the coating compositions described in these publications still leave much to be desired.

It is an object of this invention to provide coating aminoplast compositions which can be applied without solvent or with a low solvent content and which produce coatings of high elasticity combined with high hardness. It is another object to provide novel varnishes and enamels produced therefrom. Other objects will be apparent to those skilled in the art to which this invention pertains.

SUMMARY OF THE INVENTION

According to this invention, coating compositions without the disadvantages of the prior art are produced, using as a binder an aminoplastester mixture consisting essentially of 45–15 percent by weight of one or more of an aminoplast or a low-molecular precursor thereof; and 55–85 percent by weight of a hydroxyl group containing esters wherein the ester component has an average molecular weight of less than 600 and is produced by the esterification of I. an alcohol reactant consisting essentially of:
 1. 0–50 molar percent of one or more aliphatic polyols containing 3 to 4 hydroxyl groups and 3–6 carbon atoms, and
 2. 100–50 molar percent of a diol component consisting of:
  a. at least 70 molar percent of one or both of ethylene glycol and 1,2-propanediol, and
  b. 0–30 molar percent of one or more other aliphatic or cycloaliphatic diols whose hydroxyl functions are separated by 2–8 carbon atoms and 0–2 of the carbon atoms in the chain are substituted by oxygen atoms which are separated from each other and from the hydroxyl groups by at least 2 carbon atoms; and II. an acid mixture consisting essentially of:
 1. 80–20 molar percent of at least one aromatic or cycloaliphatic dicarboxylic acid whose carboxyl groups are positioned ortho or meta or a functional acid derivative thereof convertible to an ester of the alcohol reactant, and
 2. 20–80 molar percent of at least one saturated aliphatic dicarboxylic acid of 4–12 carbon atoms or functional acid derivative thereof convertible to an ester of the alcohol component.

DETAILED DISCUSSION

A. Aminoplast Component

Aminoplasts are a conventional component in coating compositions. Many of these have the formula —NH—CH$_2$—OR wherein R is hydrogen or alkyl of 1–4 carbon atoms and the unsatisfied valence is an organic moiety. Examples of aminoplasts are the conventional reaction products of aldehydes, especially formaldehyde, with one or more amino or amido group-containing substances, such, as for example, with melamine, urea, dicyandiamide, benzoguanamine, and mixtures of such condensation products. There can also be used polymers having the structure of copolymerizates into which is polymerized an amide of an α-ethylenically unsaturated carboxylic acid having N-methylol- and/or N-methylol-ether groups, for example, such polymers which are obtained following the methods described in the U.S. Pat. No. 2,940,944, and the German Patent Applications Nos. 1,060,596, 1,083,548 and 1,089,549.

Especially suitable are the aminoplasts modified with alcohols, preferably those containing 1–4 carbon atoms, particularly benzoguanamine resins of a low degree of condensation.

Because these resinous aminoplasts are sometimes compatible only to a limited extent with the esters to be emloyed according to this invention, it is preferred to utilize partially or wholly the low-molecular weight precursors of aminoplasts which are miscible with the esters to be employed according to the invention to a practically unlimited degree. Examples of such aminoplast precursors are dimethylolurea, tetramethylol benzoguanamine, trimethylol melamine and hexamethylol melamine, which can also be employed in a partially or completely etherified form, e.g., as dimethoxymethyl urea, tetrakis (methoxymethyl) benzoguanamine, tetrakis (ethoxymethyl) benzoguanamine and polyethers of hexamethylol melamine, e.g., hexamethoxymethyl melamine and hexabutoxymethyl melamine. Especially preferred are liquid hexamethylol melamine derivatives which are partially etherified with alcohols of 1–4 carbon atoms.

Thus, a wide variety of commercially available aminoplasts can be used for combining with the special esters of the present invention. For more details regarding the aminoplasts which can be used, reference is made to "Organic Protective Coatings," Von Fischer and Bobaleck, 1953, Reinhold, pages 210–225; "Lackkunstharze" by H. Wagner and H. F. Sarx, Carl Hanser Verlag, Munich, 4th Edition, 1959, pages 60–74. Of course, it is also possible to use mixtures of all the above N-methylol products. In general then, any compound of the formula —NH—CH$_2$—O—R can be used wherein R represents hydrogen or alkyl of 1–4 carbon atoms, and the unsatisfied nitrogen valence is attached to an organic moiety capable of incorporation into a film and which does not interfere with the curing reaction.

The miscibility of the resinous aminoplasts and the esters and their compatibility during the backing step can be improved by reacting the ester with the aminoplast in a conventional manner with each other, in the absence of solvent or in solution. In doing so, care must be taken that the reaction does not progress until crosslinking occurs. This baking step can be effected, for example, by heating the mixture, or a solution of the two resins, for a short time, optionally in the presence of a catalyst, such as, for example, an organic or mineral acid. It is also possible to add the ester component to the charge prior to or during the preparation of the aminoplast resins from, for example, urea, benzoguanamine, or melamine and an aldehyde. It is, of course, also possible to employ concomitantly and additionally customary alcohols for the modification of the thus-formed plasticized aminoplast resins. The methods for the production of such plasticized amino-aldehyde resins are known. A plurality of suitable operating directives can be found in the literature (see, for example, Houben-Weyl, "Methoden der organischen Chemie" [Methods of Organic Chemistry], 4th Edition, Vol. 14/2, pp. 319 et seq., Georg Thieme Publishers, Stuttgart, 1963, or "Ullmanns Enzyklopaedie der technischen Chemie" [Ullmann's Encyclopedia of Technical Chemistry], 3rd Edition, Vol. 3, pp. 475 et seq., Urban und Schwarzenberg, Munich, 1953).

B. Ester Component

I. Alcohol Reactant

The alcohol reactant used to form the ester component of the coating composition contains a diol component and, optionally, a polyol component.

1. Polyol Component

The polyol component constitutes 0–50, preferably 0–25, molar percent of the alcohol reactant. It can consist of one or several polyols having 3–4 hydroxy groups and 3–6 carbon atoms.

Suitable polyols are, for examples, glycerin, trimethylolethane, trimethylolpropane, and pentaerythritol. Glycerin and trimethylolpropane are preferred.

2. Diol Component

The diol component constitutes 100–50, preferably 100–75, molar percent of the alcohol reactant. It consists essentially of at least 70, preferably 85–100, molar percent of one or both of ethylene glycol and 1,2-propanediol, any remainder being one or more other diols containing 3–12, carbons whose hydroxyl groups are separated by 2–8 carbon atoms with 0–2 of the carbon atoms in the chain being substituted by oxygen atoms which are separated from each other and from the hydroxyl groups by at least 2 carbon atoms.

Examples of such diols which can concomitantly be employed in lesser amounts with the ethylene glycol and/or 1,2-propanediol are 1,3-propanediol, 1,2-butanediol, 2,3-butanediol, 1,3-butanediol, 1,4-butanediol, 2,2-dimethyl, 1,3-propanediol, 1,6-hexanediol, 1,2-cyclohexanediol, 1,4-cyclohexanediol, 1,2-bis (hydroxymethyl) cyclohexane, 1,3-bis (hydroxymethyl) cyclohexane, 1,4-bis (hydroxymethyl) cyclohexane, x,8-bis (hydroxymethyl) tricyclo [5,2,1,0$^{2,6}$]-decane, wherein x stands for 3, 4, or 5, diethylene glycol, triethylene glycol, dipropylene glycol, or tripropylene glycol. Cycloaliphatic diols can be employed in the cis- or trans-form thereof, or as mixture of both forms.

II. Acid Mixture

The acid mixture used to form the ester component of the coating compositions of this invention consist essentially of a cyclic component and an acyclic component.

1. Cyclic Acid Component

The acid mixture contains 80–20 preferably 70 to 30 molar percent of at least one aromatic or cycloaliphatic dicarboxylic acid whose carboxyl groups are positioned ortho or meta, i.e., 1,2- or 1,3-, with respect to each other, or a functional acid derivative thereof convertible to an ester of the alcohol reactant.

In general these dicarboxylic acids contain 8–12 carbon atoms, preferably 8 to 10 carbon atoms. The monocyclic carbocyclic acids are preferred, e.g., wherein the ring is a benzene, cyclohexane or bridged cyclohexane ring.

Examples of suitable aromatic and cycloaliphatic dicarboxylic acids are phthalic acid, isophthalic acid, tetrahydrophthalic acid, hexahydrophthalic acid, hexahydroisophthalic acid, as well as endomethylene or endoethylenetetrahydrophthalic acid, hexachloroendomethylenetetrahydrophthalic acid, or tetrabromophthalic acid. The cycloaliphatic dicarboxylic acids can be employed in their trans or cis configuration or as a mixture of both forms. Phthalic acid, isophthalic acid, and hexahydrophthalic acid, especially phthalic acid, are preferred.

2. Acyclic Acid Component

The acid mixture contains 20–80, preferably 70 to 30, molar percent of at least one saturated aliphatic dicarboxylic acid containing 4–12, preferably 4–6, carbon atoms, or a functional acid derivative thereof convertible to an ester of the alcohol reactant.

Particularly suitable as saturated aliphatic dicarboxylic acids are succinic acid, glutaric acid, adipic acid, suberic acid, sebacic acid, azelaic acid, decanedicarboxylic acid, or 2,2,4- and 2,4,4-trimethyladipic acid. Adipic acid is especially preferred.

In place of the free cyclic and/or acyclic dicarboxylic acids, it is also possible and often preferable to employ a functional acid derivative thereof, e.g., an ester thereof with a short-chain alkanol, e.g., dimethyl, diethyl, or dipropyl ester. The anhydrides of those dicarboxylic acids which form anhydrides also can be employed, e.g., phthalic anhydride, hexahydrophthalic anhydride, tetrahydrophthalic anhydride, succinic anhydride, or glutaric anhydride.

Ester Production

Coatings exhibiting especially satisfactory properties are obtained with the use of linear and/or branched esters having average molecular weights of 200–600, preferably 200–400, and containing predominantly hydroxyl groups as terminal groups, i.e., those which have been prepared with an excess of the alcohol reactant. Esters having molecular weights of less than 400 are particularly preferred because of their low viscosity and the particularly advantageous processability of the coating compositions produced therefrom. Average molecular weight means the numerical means.

The esters can be prepared in accordance to all conventional and customary procedures, e.g., with or without a catalyst, with or without the introduction of a stream of inert gas, as solution condensation, melt condensation, or azeotropic esterification, at temperatures of up to 220°C, or higher, so that the water or the alkanols produced by the esterification are continuously removed. The esterification takes place almost quantitatively and can be followed by measuring the hydroxyl and acid numbers. Normally, esterification conditions are selected so that the reaction is as complete as possible, i.e., until the acid number, in case of ester charges of $n$ mols of diol, $m$ mols of polyol, and $(n+m-1)$ mols of dicarboxylic acid, is smaller than 10 mg. KOH/g. The molecular weight of the esters can thus be regulated by the ratio of the initially charged amounts of alcohol reactant and dicarboxylic acid mixture. Of course, when using other ratios of initially charged amounts of alcohol reactant to dicarboxylic acid mixture, it is also possible to produce suitable esters having higher acid numbers. However, care must be taken that the condensation is interrupted when the desired molecular weight has been attained.

The esterification temperature is selected so that the losses in readily volatile substances remain small, i.e., during at least the first period of the esterification, the process is conducted at a temperature below the boiling point of the lowest-boiling starting substance. In this connection, it is often advantageous to employ such readily volatile substances in a minor excess, e.g., about 2–15 molar percent, based on the theoretically required amount, in order to compensate for any losses which might occur.

The properties of the coatings produced from the esters to be employed according to this invention are dependent on the average molecular weight, the functionality, and the composition of the esters. At higher average molecular weights, the hardness of the varnish film is, in general, reduced, whereas the elasticity increases. In contrast thereto, at lower molecular weights, the flexibility of the varnish film is decreased and the hardness simultaneously increased. Differences in the composition of the ester also have a similar effect. With a higher proportion of aliphatic dicarboxylic acids and/or with aliphatic dicarboxylic acids of a longer chain length, the elasticity of the varnish film increases, and its hardness is decreased. Conversely, with an increasing proportion of cyclic dicarboxylic acid, the varnish film becomes harder and less flexible. A similar influence is exerted by the diols. With increasing chain length and/or with a rising proportion of the diol component in the ester, the varnish film becomes softer and more flexible. Employing additional diols having short and branched carbon chains or having cycloaliphatic rings results in varnish films which are harder and less elastic as the proportion of these diols is increased.

Also the molar ratio of polyol to diol influences the mechanical properties of the varnish films. With a decreasing molar ratio of polyol to diol, the hardness of the films decreases whereas the elasticity thereof is increased. Conversely, with larger molar ratios of polyol to diol, the flexibility of the varnish films is reduced and the hardness thereof is enhanced. It is thus readily possible to select, within the scope of the claimed range, esters exhibiting properties which are optimum for the respective purpose for which the coating compositions of this invention are employed.

Aminoplast-Ester Mixture

For purposes of forming the aminoplast-ester mixtures according to this invention, a large number of commercial aminoplasts and precursors thereof are available.

To produce the coating compositions of this invention, the ester and the aminoplast precursor or the aminoplast solution are normally first mixed with each other. The weight ratio of ester to aminoplast or the precursor thereof can vary between about 55:45 and about 85:15, preferably about 60:40 to 80:20. The ratio which is optimum for the respective final use of the varnishes can be readily determined by simple preliminary experiments. In this connection, by increasing the proportion of aminoplast, the hardness of the varnish films is often increased and the elasticity lessened whereas lowering the proportion of aminoplast often reduces hardness and increases flexibility.

In correspondence with the desired end-use application of the varnish, the viscosity thereof can be lowered by the addition of a conventional varnish solvent, such as, for example, propanol, isopropanol, butanol, ethyl acetate, butyl acetate, ethyl glycol, ethyl glycol acetate, butyl glycol, methyl ethyl ketone, methyl isobutyl ketone, cyclohexanone, trichloroethylene, or mixtures of various ones of such solvents. It is, of course, also possible, and advisable for economical reasons, to employ additionally more or less large amounts of less polar solvents, such as, for example, benzene, toluene, xylene, or higher-boiling aromatic cuts. The amount of these less polar solvents employed can be selected as desired within the scope of the solubility of the esters employed according to the invention, and the compatibility thereof with the aminoplasts which are used. The amount of polar solvent can often reach a proportion of more than 80 percent of the total solvent mixture.

When using commercially available aminoplast solutions, the amount of solvents contained therein is normally completely sufficient for also maintaining the mixture of ester and aminoplast solution at a sufficiently low degree of viscosity. Thus, the coating compositions of this invention ordinarily contain maximally about 30 percent by weight of solvent, based on the total quantity of binder and solvent, so that clear varnishes are obtained having solids contents of more than 70 percent by weight.

When using the preferred aminoplast precursors, which are liquids, and the preferred esters to form the ester-aminoplast mixture which are utilized according to this invention, the addition of a solvent is in most cases superfluous, since the coating compositions, especially those prepared from very low-molecular esters, exhibit sufficiently low viscosities to be utilized without a solvent.

Varnish and Enamel Production

The viscosities of the uncured varnishes should be no greater than 500 poises, preferably not greater than 100 poises, because at higher viscosities undesired blister formation during the baking of the coatings may occur, due to the condensation products liberated during the cross-linking process. Optionally, the viscosity of the varnishes can be lowered during the application thereof by elevating the temperature to about 60° C., thus improving the processability of the varnishes.

The varnishes can contain conventional additives and auxiliary agents, e.g., pigments, flow agents, and additional other binders, such as, for example, epoxy resins and silicone resins, the latter containing hydroxyl groups.

The thus-obtained varnish is applied in accordance with conventional processes, for example by spreading, spraying, dipping, or rolling, and baked at temperatures of between 100° and 250° C. The cross-linking reactions taking place during this process are catalytically accelerated by means of acids. When using esters having a very low acid number, it is thus possible to add to the varnish acid substances. By the addition of, for example, 0.5 percent of p-toluenesulfonic acid (based on the total binder), the cross-linking reaction is greatly accelerated.

The acid number of the ester can also be subsequently increased by reacting an ester with a low acid number with an anhydride of a relatively strong dicarboxylic acid, e.g., maleic anhydride. In this manner, the baking temperatures can be lowered without the addition of strongly acidic substances. This reaction is normally conducted by mixing the ester with the desired amount of dicarboxylic acid anhydride and agitated until the added anhydride is completely dissolved. Thereafter, the mixture is heated to about 120–150° C. for about 1–3 hours. The same reaction can also be conducted without difficulty in a solution of the ester if the solvent does not contain any functional groups which can react with the acid anhydride under the aforementioned reaction conditions.

The coatings produced in accordance with this invention exhibit a multitude of advantageous properties. They have a high gloss, can be readily pigmented, show an excellent resistance against yellowing and exhibit very good adhesion, especially to metals. When subjecting the coatings to heat aging of 72 hours at 100° C., no visible yellowing can be detected. The resistance of the coatings of this invention against yellowing can also be shown by a heat aging step of 72 hours at 130° C. The coatings are resistant to solvents, e.g., xylene, petroleum ether-benzene mixtures and esters. They also exhibit good resistance to acid and alkali. In salt spray tests, tropical condition tests and tests in the Weather-Ometer, they show an excellent corrosion-protective effect and weatherproofness.

However, the most outstanding property of the coatings produced according to this invention is their combination of great elasticity and high hardness.

The elastic behavior of coatings is usually determined by conducting the Erichsen depression test (German Industrial Standard DIN 53,156), using as a standard for the elasticity the depression (in mm.) of an enameled metal sheet at which the varnish coating begins to crack. In this test deformation of the coating takes place slowly (advancement: 0.2 mm./sec.).

The behavior of coatings upon instantaneous deformation is determined by the impact depression test. This test can be conducted, for example, with the impact depression device 226/D of the Erichsen company, Hemer-Sundwig. In this device, a hemisphere having a radius of 10 mm. is dropped onto the opposite side of a metal sheet varnish-coated on one side. By varying the height of the falling weight, the depth of the depression can be varied. The impact depression value is the depth of the depression (in mm.) at which the varnish coating begins to crack. (In several examples below, the value is stated to be >5 mm., since the above-described device cannot make a greater depression in the 1 mm. thick deepdrawn metal sheets normally employed in the test.)

As stated above, relatively dilute coating compositions of polyesters and aminoplasts are conventional. However, these coating compositions exhibit, in addition to the disadvantages of having a high solvent content, further disadvantages since they result in coatings having less than optimum properties. Aminoplast-based coating compositions which can be applied with a low solvent content or without any solvent are also conventional. However, these coating compositions produce coatings having very unsatisfactory properties. In contrast thereto, the coating compositions of this invention combine the advantages of both conventional systems without exhibiting the disadvantages of either, i.e., they can be applied solvent-free or with a low solvent content and produce coatings having excellent mechanical and chemical properties.

This array of properties opens up a versatile range of applications for the coating compositions of this invention, especially when coating metal sheet in accordance with the so-called "coil coating" process. The coating compositions of this invention are especially suitable for varnishing materials which are post-formed, e.g., by punching, during which step the high impact stress to which the coating is subjected is withstood by the coatings compositions of this invention in an excellent manner.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

Unless otherwise indicated, all percentages and ratios are on a weight basis.

PREPARATION OF THE ESTER

A mixture of 65.1 g. of ethylene glycol (1.05 mol), 79.8 g. of 1,2-propanediol (1.05 mol), 74 g. of phthalic anhydride (0.5 mol), and 73 g. of adipic acid (0.5 mol) is heated under agitation while passing a small nitrogen stream therethrough, in accordance with the following time-temperature plan: 2 hours at 140° C.; 2 hours at 160° C.; 4 hours at 180° C.; 4 hours at 190° C.; and 4 hours at 200° C. During this time, a total of 25 ml. of water is separated. The clear, colorless ester mixture exhibits an acid number of 2.5 mg. KOH/g. and a hydroxyl number of 454 mg. KOH/g., corresponding to an average molecular weight of 245.

PREPARATION OF A VARNISH

The ester mixture is mixed with a commercially available hexamethylol melamine derivative or a solution of a melamine-formaldehyde or benzoguanamine-formaldehyde condensate in the desired solids ratio. The varnish contains less than 30 percent, preferably 0–20 percent, more preferably 0–10 percent and most preferably no solvent.

If the ester and the aminoplast or the aminoplast precursor are incompatible with each other, the mixture of the two components, which will contain solvent when employing an aminoplast solution, is heated for 10–60 minutes at 50–100° C.

PREPARATION OF AN ENAMEL

In order to prepare an enamel, a clear varnish prepared as described above, optionally after the addition of a small percentage of solvent, is pigmented with titanium dioxide in the desired binder:pigment ratio, e.g., 10:1.

PRODUCTION AND TESTING OF THE COATING COMPOSITIONS

For testing purposes, the clear varnish or the enamel is applied at room temperature to metal test sheets and glass plates and then baked. In order to lower the baking temperature, 0.5 percent p-toluenesulfonic acid (based on the total binder) is added to the varnish. The addition of p-toluenesulfonic acid to solvent-free varnishes is suitably effected by first dissolving the p-toluenesulfonic acid in the liquid aminoplast, or in the liquid, low-molecular aminoplast precursor prior to the addition of the ester or ester mixture thereto. The thickness of the coatings being tested is 30–40 μ in all examples. The hardness test is conducted in accordance with DIN 53,157. The elasticity is determined in accordance with the methods described hereinabove.

The adhesion is tested by measuring the deep-drawability of the varnish over the point of intersection of a 90° cross cut. The depression value is indicated, in mm., at which the coating is detached from the metal test sheet.

Examples 1–21 are complied in the table, wherein also the type of aminoplast employed is set forth. (In the column "Type of Aminoplast," K denotes the use of a butylated melamine-formaldehyde condensate and B denotes the use of a butylated benzoguanamine-formaldehyde condensate, whereas HMM indicates that a hexamethylol melamine derivative was employed.) The two numerical values inserted in the column "Solvent Resistance" characterize the swelling and the scratch resistance of the baked varnish coating after exposure to xylene for 15 minutes at room temperature. The first number indicates the swelling in three stages of evaluation (1 = unswollen, 2 = slightly swollen, and 3 = strongly swollen) and the second numerical value represents the scratch sensitivity, likewise in three grades (1 = scratchproof, 2 = reduced scratch resistance, 3 = no scratch resistance).

COMPARATIVE EXPERIMENT 110 g. of a 55 percent solution of a butylated melamine-formaldehyde condensate in a xylene-butanol mixture (1:1) is mixed with 40 g. of dehydrated castor oil fatty acid and 50 g. of castor oil. After distilling off the solvent at 65° C. under vacuum, the thus-obtained turbid and yellow varnish is applied to metal test sheets and glass plates at room temperature. The coatings baked for 30 minutes at 140° C. exhibit a hardness of 49 seconds, a deep-drawability of 1.5 mm., no impact depression (< 1 mm.), an adhesion of 1.4 mm., and only poor solvent resistance (3/3).

TABLE

| Ex. No. | Ester from [mol] | Ave. Molecular Weight | Weight Ratio Ester: Aminoplast : TiO$_2$ | Type of Aminoplast | Solvent Content of Varnish [% by Weight] | Viscosity of Varnish at 25°C. [poises] | Baking Conditions [°C./min] | Hardness Acc. to DIN 53157 [sec] | Deep Drawability Acc. to DIN 53156 [mm] | Impact Depression [mm] | Adhesion [mm] | Solvent Resistance |
|---|---|---|---|---|---|---|---|---|---|---|---|---|
| 1 | 2.05 EG$^{r)}$ 0.75 P A$^{r)}$ 0.25 ADA$^{r)}$ | 262 | 68:32: 0 | HMM$^{r)}$ | 0 | — | 150/30 | 228 | 7.4 | 2–3 | — | 1/1 |
| 2 | 2.05 EG 0.66 P A 0.34 ADA | 262 | 58:42: 0 68:32: 0 | HMM HMM | 0 0 | — | 150/30 150/30 | 231 218 | 5.3 7.4 | 2–3 4 | — | 1/1 1/1 |

TABLE – Continued

| Ex. No. | Ester from [mol] | Ave. Molecular Weight | Weight Ratio Ester: Aminoplast : TiO₂ | Type of Aminoplast | Solvent Content of Varnish [% by Weight] | Viscosity of Varnish at 25°C. [poises] | Baking Conditions [°C./min] | Hardness Acc. to DIN 53157 [sec] | Deep Drawability Acc. to DIN 53156 [mm] | Impact Depression [mm] | Adhesion [mm] | Solvent Resistance |
|---|---|---|---|---|---|---|---|---|---|---|---|---|
| 3 | 2.05 EG 0.5 P A 0.5 ADA | 248 | 67:33: 0 | HMM | 0 | — | 150/30 | 203 | 7.8 | 4 | 5.4 | 1/1 |
| 4 | 2.05 EG 0.34 P A 0.66 ADA | 242 | 56:44: 0 / 66:34: 0 | HMM / HMM | 0 / 0 | — / — | 150/30 / 150/30 | 192 / 158 | 7.1 / 7.5 | 2-3 / >5 | — / 4.0 | 1/1 / 1/1 |
| 5 | 2.05 EG 0.25 P A 0.75 ADA | 243 | 66:34: 0 | HMM | 0 | — | 150/30 | 117 | 7.5 | >5 | 7.0 | 1/1 |
| 6 | 2.05 PG 0.66 P A 0.34 ADA | 279 | 69:31: 0 | HMM | 0 | — | 150/30 | 226 | 7.1 | 2 | — | 1/1 |
| 7 | 2.05 PG 0.5 P A 0.5 ADA | 273 | 69:31: 0 | HMM | 0 | — | 150/30 | 219 | 8.3 | 4 | — | 1/1 |
| 8 | 2.05 PG 0.34 P A 0.66 ADA | 272 | 68:32: 0 | HMM | 0 | 129 | 150/30 | 173 | 8.6 | 4 | 6.0 | 1/1 |
| 9 | 1.05 EG 1.05 PG 0.5 P A 0.5 ADA | 245 | 70:30 :0 / 70:30: 0 / 70:30:25 / 70:30:40 / 70:30: 0 | HMM / HMM / HMM / HMM / K | 0 / 0 / 0 / 0 / 19.5 | 11.7 / 11.7 / — / — / — | 150/30 / 160/30 / 150/30 / 150/30 / 150/30 | 177 / 160 / 176 / 176 / 140 | 9.0 / 8.4 / 8.0 / 7.4 / 5.7 | 5 / 3 / 4-5 / 5 / 4 | 7.2 / 7.1 / 7.3 / 6.5 / 4.9 | 1/1 / 1/1 / 1/1 / 1/1 / 1/1 |
| 10 | 1.55 EG 1.55 PG 1 P A 1 ADA | 420 | 70:30: 0 | HMM | 0 | 56.8 | 150/30 | 166 | 9.0 | 5 | 7.3 | 1/1 |
| 11 | 1.55 EG 1.55 PG 1.2 P A 0.8 ADA | 407 | 70:30: 0 | HMM | 0 | 78.0 | 150/30 | 195 | 8.3 | 4-5 | 7.3 | 1/1 |
| 12 | 1.55 EG 1.55 PG 1.4 P A 0.6 ADA | 428 | 70:30: 0 | HMM | 0 | 130.8 | 150/30 | 215 | 7.8 | 3 | — | 1/1 |
| 13 | 2.3 EG 0.8 PG 1 P A 1 ADA | 407 | 70:30: 0 | HMM | 0 | 36.0 | 150/30 | 153 | 8.9 | 5 | 8.2 | 1/1 |
| 14 | 0.8 EG 2.3 PG 1.1 P A 0.9 ADA | 449 | 70:30: 0 | HMM | 0 | 79.3 | 150/30 | 202 | 8.7 | 4 | — | 1/1 |
| 15 | 1.05 EG 1.05 PG 1 P A 1 ADA | 417 | 70:30: 0 | HMM | 0 | 245.0 | 150/30 | 137 | 6.5 | 5 | 3.9 | 1/1 |
| 16 | 3.95 EG 1.9 P A 0.95 ADA | 568 | 70:30: 0 / 60:40: 0 / 60:40: 0 | HMM / HMM / B | 0 / 0 / 19.5 | — / — / — | 150/30 / 150/30 / 150/30 | 154 / 193 / 181 | 8.9 / 8.4 / 8.6 | 3-4 / 2-3 / 4 | 3.5 / — / — | 1/1 / 1/1 / 1/1 |
| 17 | 0.85 EG 0.75 PG 0.5 CHDM 0.4 P A 0.6 ADA | 298 | 70:30: 0 | HMM | 0 | — | 150/30 | 180 | 7.6 | 4 | — | 1/1 |
| 18 | 1.05 EG 1.0 Gly 0.5 P A 0.5 ADA | 290 | 70:30: 0 | HMM | 0 | — | 150/30 | 216 | 5.9 | 1-2 | — | 1/1 |
| 19 | 1.55 EG 0.5 Gly 0.4 P A 0.6 ADA | 278 | 69:31: 0 | HMM | 0 | — | 150/30 | 175 | 7.4 | 4 | — | 1/1 |
| 20 | 2.05 EG 1.45 PG 0.25 Gly 1.8 P A 0.9 ADA | 598 | 80:20: 0 / 70:30: 0 | HMM / HMM | 0 / 0 | — / — | 150/30 / 150/30 | 174 / 203 | 10.5 / 8.4 | >5 / 3 | 7.1 / — | 1/1 / 1/1 |
| 21 | 1.55 EG 1.55 PG 0.2 Gly 0.35 CHDM 1.7 P A 0.85 ADA | 597 | 70:30: 0 | HMM | 10 | — | 150/30 | 163 | 7.6 | 5 | 6.1 | 1/1 |

ABREVIATIONS
EG — ethylene glycol
P A — phthalic anhydride
ADA — adipic acid
HMM — hexamethylol melamine derivative ("Maprenal" WL of the firm Cassella Farbwerke Mainkur AG, Frankfurt
PG — 1,2-propanediol
K — melamine-formaldehyde condensate ("Maprenal" TTX of the firm Cassella Farbwerke Mainkur AG, Frankfurt)
B — benzoguanamine-formaldehyde condensate ("Maprenal" HM of the firm Cassella Farbwerke Mainkur AG, Frankfurt)
CHDM — 1,4-bis (hydroxymethyl) cyclohexane
Gly — glycerin The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a coating composition having a viscosity of up to 500 poises and whose binder consists essentially of an aminoplast-ester mixture consisting of
   A. 45–15 percent of at least one of an aminoplast component and a low-molecular precursor thereof, and
   B. 55–85 percent by weight of a hydroxyl group-containing ester component having an acid number of less than 10 mg. KOH/g., and produced by the esterification of
      I. an alcohol reactant consisting essentially of:
         1. 0–50 percent of one or more aliphatic polyols of 3 or 4 hydroxyl groups and 3–6 carbon atoms, and
         2. 100–50 molar percent of a diol component consisting essentially of:
            a. at least 70 molar percent of one or both of ethylene glycol and 1,2-propanediol, and
            b. 0–30 molar percent of one or more other aliphatic or cycloaliphatic diols whose hydroxyl groups are separated by 2–8 carbon atoms and 0–2 of the carbon atoms in the chain are substituted by oxygen atoms which are separated from each other and from the hydroxyl groups by at least 2 carbon atoms, and
      II. an acid mixture consisting essentially of:
         1. 80–20 molar percent of at least one aromatic or cycloaliphatic dicarboxylic acid whose carboxyl groups are positioned ortho or meta or a functional acid derivative thereof convertible to an ester of the alcohol reactant, and
         2. 20–80 molar percent of at least one saturated aliphatic dicarboxylic acid of 4–12 carbon atoms or a functional acid derivative thereof convertible to an ester of the alcohol reactant the improvement wherein the coating composition contains from 0–20 percent solvent and the polyester has an average molecular weight of 200–400.

2. An unpigmented coating composition according to claim 1 containing 0–10 percent by weight of a solvent wherein the ester component is produced by the esterification of an alcohol reactant consisting of 0–30 molar percent of the polyol component and 100–70 molar percent of the diol component.

3. An unpigmented coating composition according to claim 1 containing 0–10 percent by weight of a solvent wherein the ester component is produced by the esterification of an acid mixture consisting essentially of 70–30 molar percent of the aromatic or cyclo-aliphatic dicarboxylic acid component and 30–70 molar percent of the saturated aliphatic dicarboxylic acid component.

4. A pigmented coating composition according to claim 1.

5. A coating composition according to claim 4 wherein the ester component is produced by the esterification of an alcohol reactant consisting solely of one or both of ethylene glycol and 1,2-propanediol.

6. A coating composition according to claim 4 wherein the saturated aliphatic dicarboxylic acid contains 4–6 carbon atoms.

7. A coating composition according to claim 4 wherein the aromatic or cycloaliphatic dicarboxylic acid portion of the acid mixture is phthalic anhydride.

8. A coating composition according to claim 6 wherein the saturated aliphatic dicarboxylic acid is adipic acid.

9. A coating composition according to claim 4 wherein the binder consists essentially of 40–20 percent by weight of component A and 60–80 percent by weight of component B.

10. A coating composition according to claim 4 wherein component A is one or more low-molecular weight aminoplast precursors which are liquid at 20° C.

11. A coating composition according to claim 10 wherein component A is a hexamethylol melamine derivative which is a liquid at 20° C. and which is partially etherified with an alcohol containing 1–4 carbon atoms.

12. A coating composition according to claim 1 wherein the binder consists essentially of 40–20 by weight of component A and 60–80 percent by weight of component B, component A being one or more low-molecular weight aminoplast precursors which are liquid at 20° C. and component B being an ester produced by the esterification of an acid mixture consisting essentially of 70–30 molar percent of phthalic anhydride and 30–70 molar percent of adipic acid and an alcohol reactant consisting essentially of one or both of ethylene glycol and propylene glycol.

13. A coating composition according to claim 12 wherein component A is a hexamethylol melamine derivative which is a liquid at 20° C. and which is partially etherified with an alcohol containing 1–4 carbon atoms.

* * * * *